March 23, 1954     W. C. FURNAS ET AL     2,673,300
ELECTRIC MOTOR STARTER MOUNTING
Filed April 13, 1953     2 Sheets-Sheet 1
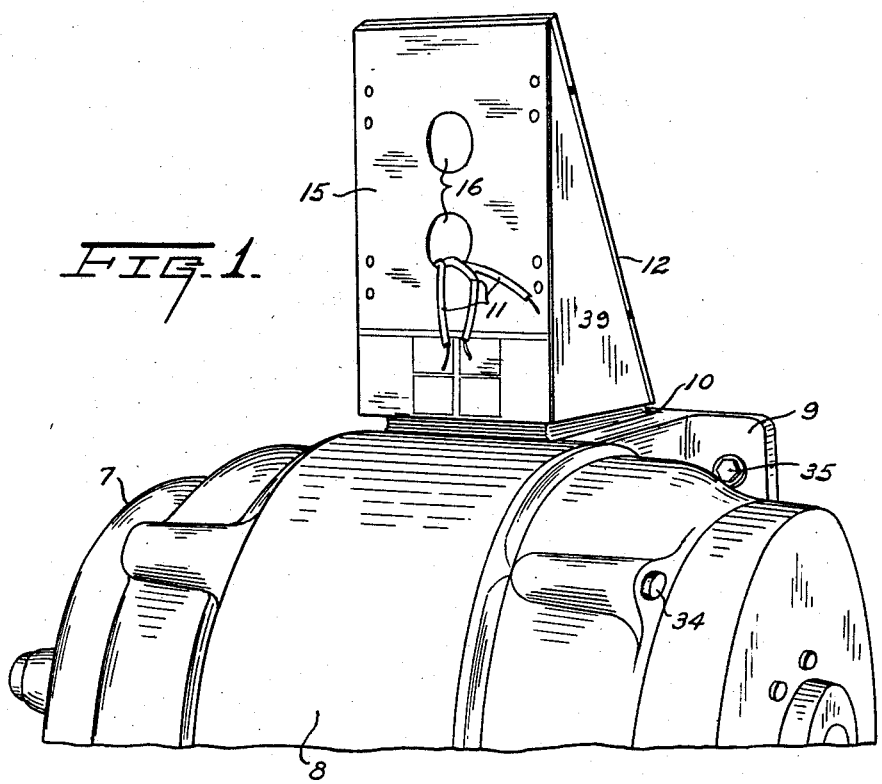
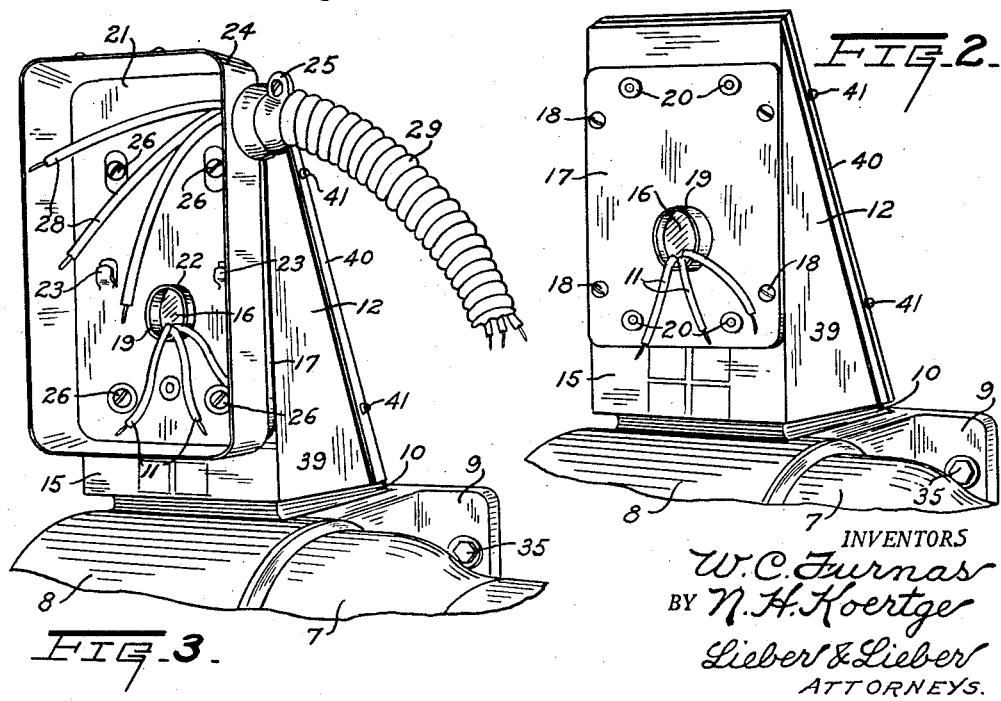
INVENTORS
W. C. Furnas
BY N. H. Koertge
Lieber & Lieber
ATTORNEYS.

March 23, 1954    W. C. FURNAS ET AL    2,673,300
ELECTRIC MOTOR STARTER MOUNTING
Filed April 13, 1953      2 Sheets-Sheet 2
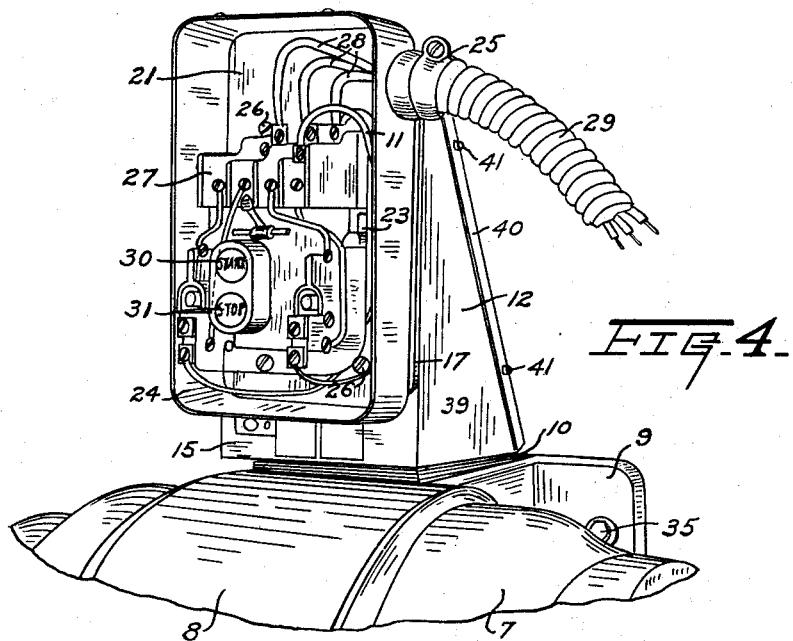
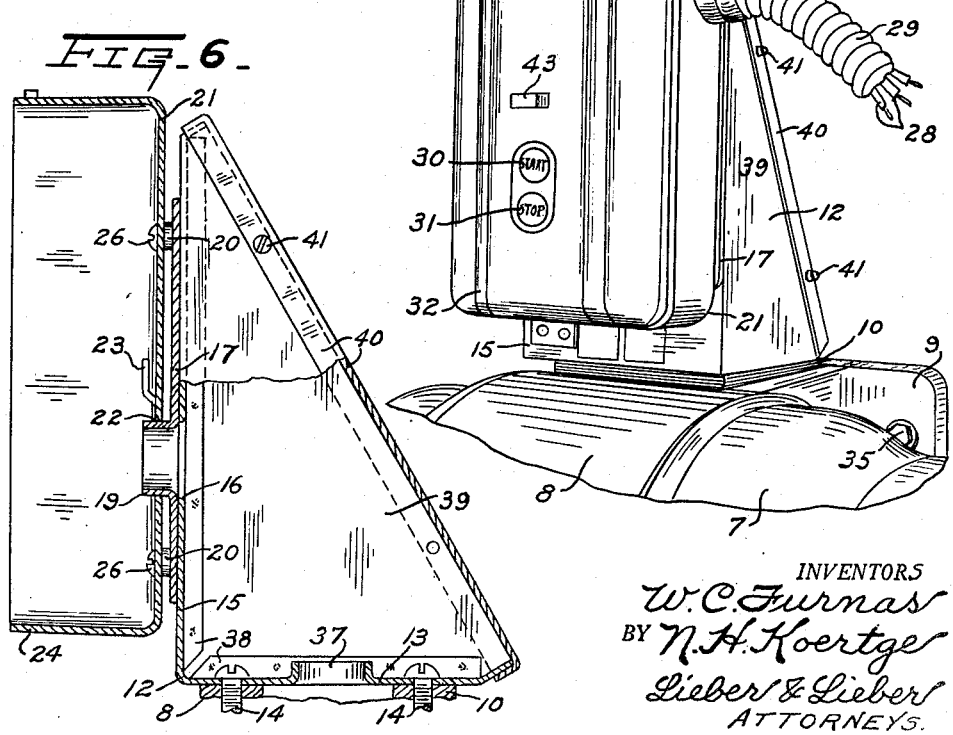
INVENTORS
W. C. Furnas
BY N. H. Koertge
Lieber & Lieber
ATTORNEYS.

Patented Mar. 23, 1954

2,673,300

UNITED STATES PATENT OFFICE 2,673,300

ELECTRIC MOTOR STARTER MOUNTING

William C. Furnas, Batavia, and Nobel H. Koertge, Glen Ellyn, Ill., assignors to Furnas Electric Company, Batavia, Ill., a corporation of Illinois Application April 13, 1953, Serial No. 348,496

8 Claims. (Cl. 310—71)

This invention relates in general to improvements in starter switch mountings for electric motors or the like, and relates more specifically to improved instrumentalities for supporting a gravity type magnetic motor controller directly upon the motor when the latter is suspended with its base disposed otherwise than in horizontal position.

The primary object of the present invention is to provide an improved mounting for electric motor starters associated with standard motors when the supporting bases of such motors are disposed in non-horizontal position.

As indicated in our co-pending application Serial No. 281,758, filed April 11, 1952, now Patent No. 2,652,506 dated September 15, 1953, it has long been customary to mount the starting switches or controllers for electric motors upon supports frequently located remote from and which were independent of the motor mountings, the electrical current conductors being confined within conduits connecting the motor terminal outlets with the switch housings. This prior practice not only necessitated the provision of separate mountings for the motors and switches, but also required the use of long conductors and conduits and special coupling plates for connecting the motors with their starters, and when it became desirable to re-locate the motor it was also necessary to move the motor and controller as separate units. While the frames of all relatively large standard electric motors are provided with supporting bases and with side outlets for the conductors surrounded by coupling attachment pads, these motors are sometimes mounted with the base in horizontal position above or beneath the frame, and at other times with the base disposed vertically at one side of the motor frame.

The starting switches or controllers for such electric motors are preferably of the magnetic type wherein the switch contacts are closed magnetically and opened by gravity, so that these magnetic controllers must always be disposed vertically in order to insure satisfactory operation. Then too, the housings for these magnetic switches are preferably detachably suspended from mounting plates with the aid of screws, and although such a mounting plate may be utilized to replace the coupling plate ordinarily used at the outlet pad of a standard motor when the latter is disposed with its base in horizontal position, as in our prior application, it cannot be applied directly to the motor outlet pad of the motor when its base is vertically disposed and the outlet pad of the motor frame is positioned horizontally.

It is therefore an important object of our present invention to provide improved means for mounting a magnetic starter upon an electric motor frame suspended from its side and having a horizontal outlet pad, in a manner whereby the motor supports the starter and a unitary motor and controller results.

Another important object of this invention is to provide an improved motor starter mounting for side suspended motors, wherein the starter switch may be supported directly from the motor in upright position and conveniently connected to the motor leads.

A further important object of the invention is to provide an improved electric motor and magnetic starter unit wherein the motor base may be suspended from an upright wall or the like, while the starter is carried in upright position directly by the motor frame, and the connections between the motor and its starting switch may be relatively short and are well concealed and protected.

Still another important object of our invention is to provide a simple and durable assemblage comprising a side mounted electric motor and a magnetically actuated controller therefor, wherein the controller is supported directly from the motor frame and may be conveniently installed and operated while also being transportable with its motor as a compact unit.

These and other objects and advantages of the present invention wlil be apparent from the following description from which it will also be apparent that the gist of the improvement is the provision of a special support for facilitating the mounting of a magnetic starter in upright position directly upon the frame of an electric motor suspended from a support disposed laterally thereof, and wherein the electrical conductors connecting the motor with the starter are protectively enclosed.

A clear conception of the specific features constituting the present improvement, and of the construction of a typical motor and starter unit embodying the invention, may be had by referring to the drawings accompanying and forming a part of this specification in which like reference characters designate the same or similar parts in the various views.

Fig. 1 is a perspective view of the improved switch mounting angle bracket showing the same secured to the outlet pad of a fragment of a side suspended electric motor;

Fig. 2 is a similar perspective view of the switch mounting bracket and motor fragment shown in Fig. 1, but illustrating a switch housing mounting plate applied to the upright wall of the bracket;

Fig. 3 is another similar perspective view of the switch mounting bracket and motor fragment, but showing a switch housing secured to the mounting plate of Fig. 2;

Fig. 4 is still another similar perspective view of the switch mounting and motor fragment, showing a magnetic starter switch finally suspended within the housing and connected to the motor terminals and to the power line;

Fig. 5 is an additional similar perspective view of the magnetic switch mounting and motor fragment, with the switch finally installed and enclosed ready for normal operation; and Fig. 6 is an enlarged part sectional side elevation of the angle bracket, mounting plate, and switch housing assemblage, the section having been taken vertically through the center of the assemblage.

While the embodiment of the invention specifically shown and described, includes a magnetic starter of the type forming the subject of copending application Serial No. 155,651, filed April 13, 1950, by Harold E. Cobb and William C. Furnas, associated with a standard alternating current motor of medium capacity, it is not our intent to unnecessarily restrict the utility of the improved features because of this limited disclosure; and it is also contemplated that specific descriptive terms employed herein be given the broadest possible interpretation consistent with the illustrative showing.

Referring to the drawings, the improved electric motor and starter switch disclosed by way of illustration, comprises in general, an alternating current motor 7 having a frame 8 provided with a flat base 9 and with a terminal outlet pad 10 through which three motor energizing leads or conductors 11 extend; an angle bracket 12 having a bottom 13 secured to the motor pad 10 by means of screws 14 and also having an upright front wall 15 provided with one or more central openings 16; a mounting plate 17 secured to the front wall 15 of the bracket 12 by screws 18, and having a central opening surrounded by a tubular flange 19 and also having four tapped lugs or pads 20 projecting forwardly therefrom; a magnetic switch casing or housing 21 having a central opening 22 adapted to snugly surround the plate flange 19 and being provided with a pair of switch suspension hooks 23 on the opposite sides of the opening 22 and surrounded by a continuous wall 24 having thereon a conduit coupling 25, the housing 21 being detachably secured to the plate pads 20 by means of screws 26; a magnetic switch assemblage 27 having terminals attachable to the motor conductors 11 and to power line wires 28 extending through a flexible conduit 29 connected to the coupling 25, and also being provided with an electro-magnet controlled by start and stop buttons 30, 31 respectively; and a closure cover 32 for the switch 27 cooperable with the housing wall 24 and through which the buttons 30, 31 are accessible for manipulation.

The electric motors 7 produced by various manufacturers are all of relatively standard construction, with the main frame 8 clamped between opposite end heads by means of a series of parallel screw bolts 34, and having the base 9 formed integral with the frame 8 and adapted to be firmly secured to a suitable vertical or horizontal support by bolts 35. The terminal outlet pads 10 of these motors are usually disposed perpendicular to the bases 9, so that when the motor base 9 is disposed horizontally the adjacent pad 10 will be vertical; whereas when the base 9 is disposed vertically as in the accompanying drawings, then the pad 10 will be disposed horizontally. The motor pads 10 are also provided with tapped holes for the reception of coupling plate attaching screws, and these holes do vary in spacing and number for different types and styles of motors.

The angle bracket 12 which is an important feature of the present invention, may be formed of sheet metal, and the base 13 is provided with a central opening surrounded by an annular flange 37 while the opposite edges of the base 13 and of the front wall 15 are also provided with integral side flanges 38 to which triangular sheet metal side walls 39 are secured, as by spot welding, see Fig. 6. In order to permit the bracket 12 to be fastened to motor frame pads 10 having different numbers and spacing of the attaching holes for screws 14, the base 13 is preferably provided with holes surrounding the central opening and flange 37 adapted to coincide with the tapped holes in the pads 10 of various sizes and styles of motors 7, and the upright front wall 15 is also preferably provided with two openings 16 the lower of which is adapted to cooperate with a magnetic switch 27 when located above the motor as shown, while the upper opening 16 is cooperable with a similarly disposed switch located beneath a motor having the pad therebeneath. The rear inclined edges of the triangular side walls 39 are also adapted to receive a closure cover 40 which may be detachably secured thereto by screws 41 so as to enclose and protect the conductors 11 after they have been passed through the bottom and front openings of the bracket 12.

The mounting plate 17 which is firmly attached to the bracket front wall by means of the screws 18, may also be formed of sheet metal and with the flange 19 so positioned that the opening therein will register with the opening 16 in the front wall 15 of the bracket 12. The switch housing 21 which is likewise formed of sheet metal is adapted to be rigidly attached to the pads 20 of the mounting plate 17 with the opening 22 in its rear wall snugly engaging the flange 19, by means of the screws 26, and the flange 19 should be of sufficient length to extend well into the casing 21. The switch suspension hooks 23 are formed integral with the rear upright wall of the housing 21 and are adapted to have the assembled switch 27 applied thereto in upright position after the electrical connections have been made, and the casing cover 32 which is also of sheet metal formation may be suspended from the housing walls 24 in a well known manner.

When the various parts have been properly constructed as hereinabove described, the motor 7 may be rigidly attached to a vertical wall or other suitable support by means of the bolts 35, with the terminal outlet pad 10 thereof located above and in horizontal position and with the terminals 11 extending through the central opening in the pad 10. The terminals 11 may then be passed through the flanged central opening 37 in the bracket base 13, whereupon this base may be firmly attached to the pad 10 of the motor frame 8 with the aid of the screws 14. The motor terminals 11 may thereafter be projected through one of the front wall openings 16 of the angle bracket 12, thereby partially completing the assemblage as illustrated in Fig. 1.

The switch mounting plate 17 may then be fastened to the upright front wall 15 of the bracket 12 after the terminals 11 have been passed through the opening flange 22, by means of the screws 18, and the rear closure cover 40 may thereafter be applied and secured to the bracket walls 39 with the aid of the screws 41, as shown in Fig. 2. After the power supply wires 28 have been confined within a suitable conduit 29 and extended well within an empty switch housing 21, the conduit 29 may be secured to the housing with the aid of the coupling 25, whereupon the motor terminals 11 should also be extended into the housing 21 through the opening 22 and the housing should be attached to the mounting plate 17 by means of the screws 26 as depicted in Fig. 3.

After the motor terminals 11 and power line wires 28 have been pulled into the switch box or housing 21 the switch assembly should be inserted within and suspended in upright position from the hooks 23 of the casing, whereupon the various final connections may be made as illustrated in Fig. 4. The switch 27 will then be disposed in upright position with its actuating buttons 30, 31 extending forwardly beyond the housing wall 24, and the closure cover 32 may then be finally applied to complete the unitary assembly, as shown in Fig. 5. The start and stop buttons 30, 31 may then be manipulated to control the operation of the motor 7, and an overload reset button 43 such as illustrated in Fig. 5 and which is associated with the cover 32, may also be provided; and by utilizing the upper opening 16 the same type of switch assemblage may obviously be mounted in upright position upon a similar bracket 12 secured in inverted position to a pad located beneath the motor 7.

After the motor 7 and starter switch 27 have been thus assembled, a very durable and compact unit wherein the controller is firmly and properly mounted directly upon the motor frame 8, results, and all of the electrical connections are effectively concealed and protected while the magnetic switch 27 is held in upright position for most efficient operation. The assembly may obviously be accomplished with ease, and the motor leads 11 may be relatively short and are conveniently applicable to the switch 27 while still being accessible for ready inspection by merely removing the rear cover 41. The angle bracket 12 with its flanges 38 and triangular side walls 39 provides an exceptionally strong and rigid support for the relatively heavy switch 27, even if the bracket is formed of rather light sheet metal, and the tubular flanges 19, 37 facilitate extension of the conductors 11 through the openings and also protect the wires. The improvement has proven highly satisfactory and successful in actual commercial use, and may be applied to various types of motors 7 and switches 27 by merely providing properly spaced and arranged holes in the bracket base 13 and mounting plate 17.

It should be understood that it is not desired to limit this invention to the exact details of construction of the various parts herein specifically shown and described, for various modifications within the scope of the appended claims may occur to persons skilled in the art.

We claim:

1. In a mounting for the starter switch of a side supported horizontal electric motor having a horizontal terminal outlet pad at its top provided with attachment holes spaced about the outlet, an angle bracket having a base provided with an opening alineable with the pad outlet and with a series of holes alineable with the pad attachment holes and also having an upright front wall rigidly attached to said base and provided with another opening, a mounting plate secured to said upright front bracket wall and having an opening alineable with said front wall opening and surrounded by a tubular flange, and a switch housing secured to said mounting plate and having an opening snugly fitting said tubular flange.

2. In a mounting for the starter switch of a side supported horizontal electric motor having a horizontal terminal outlet pad at its top provided with attachment holes spaced about the outlet, an angle bracket having a base provided with an opening alineable with the pad outlet and surrounded by a tubular flange and with a series of holes around the flange alineable with the pad attachment holes and also having an upright front wall formed integral with the base and provided with a horizontal opening, a mounting plate secured to said front bracket wall and having an opening surrounded by another tubular flange and which is alineable with said front wall opening, and a switch housing secured to said mounting plate around the flange thereof and having an opening snugly fitting said flange.

3. In a mounting for the starter switch of a side supported horizontal electric motor having a horizontal terminal outlet pad at its top provided with attachment holes spaced about the outlet, an angle bracket having a base provided with an opening alineable with the pad outlet and with a series of holes alineable with the pad attachment holes and also having an upright front wall rigidly attached to said base and provided with another opening, a detachable closure for said bracket coacting with the free ends of said base and of said upright wall, a mounting plate secured to said upright front bracket wall and having an opening alineable with said front wall opening and surrounded by a tubular flange, and a switch housing secured to said mounting plate and having an opening snugly fitting said tubular flange.

4. In a mounting for the starter switch of a side supported horizontal electric motor having a horizontal terminal outlet pad at its top provided with attachment holes spaced about the outlet, an angle bracket having a horizontal base provided with an opening alineable with said pad outlet and also having a front upright wall formed integral with the base and provided with another opening, opposite side walls secured to said bracket bottom and front wall, a closure cover detachably secured to said side walls, a mounting plate secured to said bracket front wall and having an opening alineable with said front wall opening, and a switch housing secured to said mounting plate and having an opening alineable with the openings in said mounting plate and in said front wall.

5. In a mounting for the starter switch of a side suspended horizontal electric motor having a horizontal terminal outlet pad at its top, an angle bracket having a horizontal base provided with a central opening surrounded by an annular vertical flange alineable with the pad outlet and also having an upright front wall formed integral with said base and provided with a central horizontal opening, a mounting plate secured to said front wall and having a central opening surrounded by an annular horizontal flange alineable with said wall opening, said horizontal flange extending forwardly of said plate and the latter also having pads disposed about its flange and extending forwardly of the plate, and a switch housing secured to said pads and having an opening snugly embracing said horizontal flange.

6. In a mounting for the starter switch of a side suspended horizontal electric motor having a horizontal terminal outlet pad at its top, a sheet metal angle bracket having a horizontal base provided with a central opening alineable with the motor outlet and also having an upright front wall formed integral with said base and provided with a central horizontal opening, said base and front wall having integral opposite side flanges, triangular side walls secured to said side flanges, a cover cooperable with said walls to enclose the space connecting said openings, and a switch supporting plate secured to said front wall and having an opening alineable with said front wall opening.

7. In a mounting for the starter switch of a side suspended horizontal electric motor having a horizontal terminal outlet pad at its top, a sheet metal angle bracket having a horizontal base provided with a central opening alineable with the motor outlet and also having an upright front wall formed integral with said base and provided with a central horizontal opening, said base and front wall having integral opposite side flanges, triangular sheet metal side walls permanently secured to said flanges, a sheet metal cover detachably secured to the free edges of said walls and enclosing the space within said bracket between said openings, and a sheet metal switch supporting plate secured to the front of said upright wall and having an opening communicating with said horizontal front wall opening and surrounded by a switch carrying tubular flange.

8. In a mounting for the starter switch of a side suspended horizontal electric motor having a horizontal terminal outlet pad at its top, a sheet metal angle bracket having a horizontal base provided with a central opening alineable with the motor outlet and also having an upright front wall formed integral with said base and provided with a central horizontal opening, said base and front wall having integral opposite side flanges, triangular sheet metal side walls permanently secured to said flanges, a sheet metal cover detachably secured to the free edges of said walls and enclosing the space within said bracket between said openings, and a sheet metal switch supporting plate secured to said front bracket wall and having a central opening communicating with said horizontal opening and also having switch mounting pads surrounding the opening therein.

WILLIAM C. FURNAS.
NOBEL H. KOERTGE.

No references cited.